United States Patent
Lichtenfels, II

(10) Patent No.: US 6,581,459 B1
(45) Date of Patent: Jun. 24, 2003

(54) ULTRASONIC FLUID LEVEL SENSING WITHOUT USING A STILLWELL

(75) Inventor: Frederick Lloyd Lichtenfels, II, Vergennes, VT (US)

(73) Assignee: Simmonds Precision Products, Inc., Vergennes, VT (US)

(*) Notice: Subject to any disclaimer, the term of this patent is extended or adjusted under 35 U.S.C. 154(b) by 1807 days.

(21) Appl. No.: 08/720,268

(22) Filed: Sep. 26, 1996

Related U.S. Application Data

(63) Continuation of application No. 08/223,886, filed on Apr. 6, 1994.

(51) Int. Cl.[7] .............................................. G01F 23/28
(52) U.S. Cl. .................................................. 73/290 V
(58) Field of Search ...................................... 73/290 V

(56) References Cited

U.S. PATENT DOCUMENTS

| | | | |
|---|---|---|---|
| 3,419,845 A | 12/1968 | Thiede et al. ............... | 340/3 |
| 4,159,647 A | 7/1979 | Paulsen et al. ............ | 73/194 A |
| 4,364,273 A | 12/1982 | Redding ...................... | 73/614 |
| 4,501,146 A | 2/1985 | Greenhalgh ............... | 73/290 B |
| 4,610,164 A | 9/1986 | Sobue et al. ............... | 73/290 V |
| 4,715,226 A | 12/1987 | Dorr ........................... | 73/290 V |
| 4,815,323 A * | 3/1989 | Ellinger et al. ............ | 73/290 V |
| 4,912,686 A | 3/1990 | Craster ....................... | 367/140 |
| 5,015,995 A | 5/1991 | Holroyd ..................... | 340/621 |
| 5,036,703 A | 8/1991 | Eriksson .................... | 73/290 V |
| 5,065,624 A * | 11/1991 | Fell ............................. | 73/290 V |
| 5,335,545 A * | 8/1994 | Leszczynski ............. | 73/290 V X |
| 5,400,376 A * | 3/1995 | Trudeau .................... | 73/290 V X |

FOREIGN PATENT DOCUMENTS

| | | | | |
|---|---|---|---|---|
| DE | 2433133 | * | 2/1975 | ............... 73/290 V |
| DE | 4014990 | * | 11/1991 | ............... 73/290 V |
| DE | 4025326 | | 11/1991 | |
| JP | 5569024 | | 5/1980 | |

* cited by examiner

Primary Examiner—Helen Kwok
Assistant Examiner—Rose M. Miller

(57) ABSTRACT

Apparatus for determining liquid level in a container, wherein the container can be subjected to attitude variations, comprising a plurality of transducers for emitting acoustic energy into the liquid in a plurality of predetermined directions towards the liquid surface from a position below the liquid surface and for receiving echoes; and control electronic for determining liquid level based on echo amplitude and time delay between the emissions and detection of the echoes.

16 Claims, 3 Drawing Sheets

ULTRASONIC FLUID LEVEL SENSING WITHOUT USING A STILLWELL

This is a continuation of copending application Ser. No. 08/223,688 filed on Apr. 6, 1994.

BACKGROUND OF THE INVENTION

The invention relates generally to apparatus and methods for determining fluid levels using ultrasonics. More particularly, the invention relates to ultrasonic fluid level detection without the use of a stillwell.

The use of acoustic transducers for determining fluid levels in containers is well known. In one form of use, an acoustic transducer is mounted within the container so that the transducer emits ultrasonic acoustic pulses directly into the fluid towards the fluid surface. A typical application of this technology is with ultrasonic fuel level sensors for detecting surface levels of fuel in a fuel tank. These sensors typically operate using echo ranging in which an ultrasonic pulse on the order of 1 megahertz is emitted towards the fluid surface. The ultrasonic pulse is reflected at the fuel/air interface and returns towards the sensor in the form of an echo pulse. This echo pulse is then detected by the same or a different sensor. The detection sensor typically produces an output signal that corresponds to receipt of the echo. Thus, the round trip time from pulse emission to echo detection corresponds to the distance of the liquid surface from the sensors.

A typical application of such an intrusive transducer is with fuel tanks used on aircraft. By mounting a transducer at the bottom of a tank, the transducer can be used to emit acoustic pulses towards the fuel surface. The round trip time for the acoustic energy to be reflected back to the transducer can be correlated with the fuel height when the velocity of the acoustic pulses in the fuel is known.

Typically in fuel tank applications, a stillwell is used to reduce the effects of bubbles in the fluid, or fluid swashing around the transducer due to aircraft movement or vibration, as well as to provide a channel for the acoustic waves to follow to the surface of the fluid and back to the sensor. The stillwell also tends to provide a smoother surface for reflecting the acoustic energy.

A stillwell is typically a round or otherwise tubular device that is located in the fuel along the line which measurements are to be taken. The inside diameter is small compared to the size of the tank, such as one inch or less, to reduce wave motion inside the stillwell.

Although the use of stillwells provides benefits such as reducing surface effects, aeration and stratification effects, in some applications it may be desirable not to use a stillwell. Eliminating the stillwell would reduce the amount of in-tank hardware, including eliminating metal or conductive tubes in the tank. Stillwell-less gauging also could increase the attitude range over which readings can be taken, as well as making sensor installation easier, including the possible use of a sensor mounted external the tank.

The objectives exist, therefore, for an acoustic fluid level gauging apparatus and methods that do not use a stillwell inside the fluid container.

SUMMARY OF THE INVENTION

To the accomplishment of the foregoing objectives, the invention contemplates, in one embodiment, liquid gauging apparatus for an aircraft fuel tank, comprising: transducer means for emitting acoustic energy into a liquid in the tank in a plurality of predetermined directions towards the liquid surface from a position below the liquid surface and for receiving echoes; and signal conditioning means for determining liquid level based on echo amplitude and time delay between the emissions and detection of the echoes.

The invention further contemplates the methods embodied in the use of such an apparatus, as well as a method for determining liquid level in a container without the use of a stillwell, wherein the container can be subjected to attitude variations, comprising the steps of emitting acoustic energy into the liquid in a plurality of predetermined directions towards the liquid surface from a position below the liquid surface using a plurality of transducers; receiving acoustic echoes using the transducers; and determining liquid level based on echo amplitude and time delay between the emissions and detection of the echoes.

These and other aspects and advantages of the present invention will be readily understood and appreciated by those skilled in the art from the following detailed description of the invention with the best mode contemplated for practicing the invention in view of the accompanying drawings.

DETAILED DESCRIPTION OF THE INVENTION

With reference to the drawings, the invention contemplates in general a multiple transducer arrangement for use in or with a fluid container, such as, for example, a fuel tank. While the invention is described herein with specific reference to an aircraft fuel tank, such description is exemplary in nature and should not be construed in a limiting sense. Those skilled in the art will understand and appreciate that the benefits and advantages of the invention can be realized in different applications besides fuel tanks.

In accordance with the basic concepts of the invention, such a multiple transducer array is configured so that acoustic energy is directed towards the liquid surface in different directions or angles relative to a reference. In this way, at least some of the acoustic energy is likely to impinge the surface/air interface perpendicularly so as to increase the echo strength. Thus, the multiple transducer array can be used to account for attitude variations of the tank, such as when an aircraft maneuvers, for example.

The capability to direct the acoustic energy in a plurality of directions towards the liquid surface to achieve "good" echo strength can be enhanced by increasing the repetition rate of the transmitted acoustic energy. A higher repetition rate compensates for a rough surface, particularly if the repetition rate is higher than the frequency of wave motion.

Figure 1:
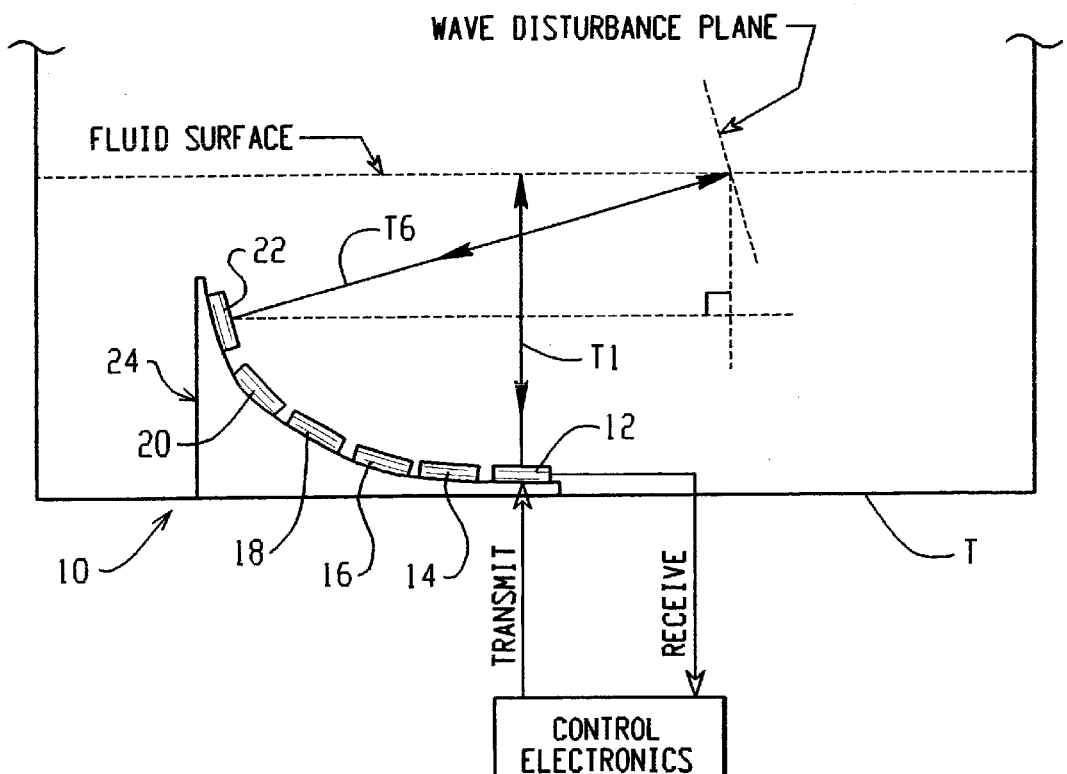
FIG. 1 is a simplified schematic diagram of one embodiment of the invention using an angled multiple transducer array.

With reference to FIG. 1 then, in this embodiment of the invention, a linear angled acoustic transducer array 10 is disposed, for example, at the bottom of a fuel tank T. The array 10 includes a number of acoustic transducers 12, 14, 16, 18, 20 and 22 mounted on a base 24. The angular array 10 is configured so as to take advantage of the fact that the optimum orientation for echo ranging is to have the transmitting surface of the transducer parallel to the fluid surface. Accordingly, each transducer 12–22 is respectively mounted on the base 24 such that each transmitting surface thereof is at a selected angle of inclination. In the embodiment of FIG. 1, for example, the transmitting surface of transducer 12 is oriented at 0 degrees or level with respect to a level tank attitude. The transmitting surface of adjacent transducer 14 is inclined at 15 degrees, the next transducer 16 at 30 degrees and so on such that the left most transducer (as viewed in FIG. 1) is inclined at 75 degrees. These angles are exemplary, of course, and can be selected as needed for particular applications.

As illustrated with dashed lines in FIG. 1, each transducer emits acoustic energy along a direction normal to the transmitting surface of the transducer, e.g. T1, T6 and so on. Assuming a smooth fluid surface 30, transducer 12 will transmit acoustic energy in a direction normal to the fluid surface when the tank attitude is level or 0 degrees. When the tank attitude is at 5 degrees, acoustic energy emitted from transducer 14 will impinge normal to the fluid surface. Tank attitudes to 90 degrees can thus be accommodated assuming deep enough fluid levels are present. As further shown in FIG. 1, surface disturbances such as waves also affect the angle at which acoustic energy impinges the surface. By energizing the transducers in an alternate repetitive manner, or energizing them all at the same time, at least one good echo should be returned because the probability is higher that one of the transducers will transmit energy in a direction normal to the surface. The probability of a good return echo will be higher if the rate at which the acoustic energy is transmitted is higher than the wave motion period, as explained hereinbefore.

For clarity, FIG. 1 only shows half of the total array of transducers. In actual practice, there could be five additional transducers angled upward in a mirror image to the right of transducer 12 so as to permit clockwise and counterclockwise rotation of the tank (as viewed in FIG. 1). However, in many applications, such as for commercial aircraft, in which pitch and roll maneuvers are typically less than 10 or 20 degrees, five transducers such as shown in FIG. 1 can provide the needed resolution. In such a circumstance, the array 10 can be installed with a bias so that, for example, the transmitting surface of transducer 16 is oriented at zero degrees (with respect to level) rather than transducer 12. In this example, then, transducers 14 and 12 could be used for detecting surface levels under positive rotation effects, while transducers 18, 20 and 22 could be used during negative rotation effects.

By mounting the array 10 transverse one of the aircraft reference axis, such as the longitudinal axis, the array 10 can compensate for changes in pitch or roll. By mounting a second array (not shown) orthogonal to array 10, the invention can be used for detecting fluid levels under both pitch and roll conditions.

Effects from surface wave motion and other turbulence including bubbles can be reduced by using a high repetition rate for the acoustic transmissions, as stated previously. The angled array, however, also inherently can reduce sensitivity to surface irregularities by interrogating the transducers either at the same time or in a time multiplex manner. By repetitively interrogating the various transducers, at least one of the transducers is likely to emit an acoustic pulse that transversely impinges the rough surface so that a good echo can be received to determine the fluid height.

The transducers can be any conveniently available commercial devices such as, for example, a PVDF film sensor part no. UDT-01 available from Atochem Sensors, Inc. This device can serve as both a transmitter and receiver of acoustic energy.

Figure 2:
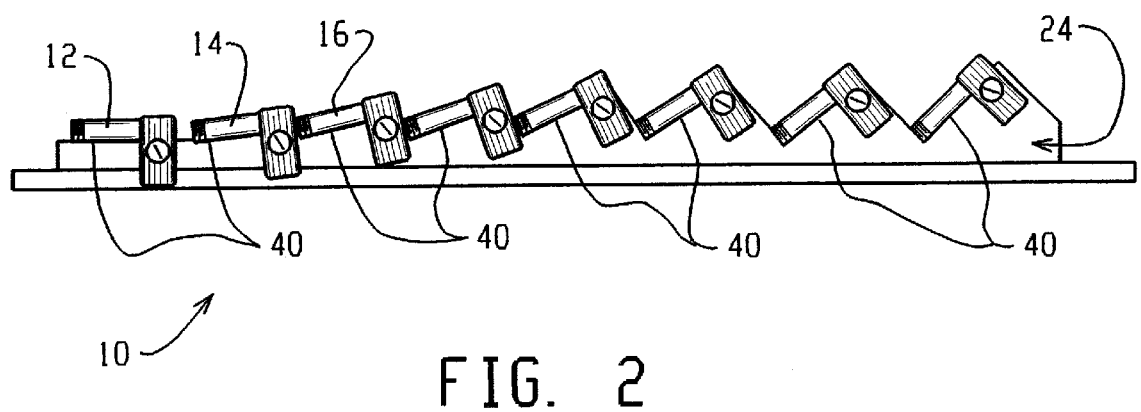
FIG. 2 is another illustration of the embodiment of FIG. 1.

FIG. 2 provides a more detailed illustration of this embodiment of the invention. The base 24 can be made of any suitable material including plastics. The base includes a plurality or progressively angled faces 40, with each face 40 providing a mounting surface for a respective transducer. The base can be provided with appropriate mounting mechanisms for fixedly attaching the transducers to the base. The base can be mounted on the tank floor, for example, by fasteners or an adhesive, the latter being particularly useful for tanks made of composite materials.

An electronics package 100 can be provided that energizes the transducers in a sequential manner, a random manner or any other repetitive technique. Alternatively, all the transducers could be activated at the same time, although this approach would limit the ability to determine which transducer received the acoustic energy that produced the best echo. A suitable electronics package 100 could be, for example, a state machine controller such as described in co-pending U.S. patent application Ser. No. 08/042,291 for "ULTRASONIC FUEL GAUGING SYSTEM USING STATE MACHINE CONTROL" filed on Apr. 2, 1993 now U.S. Pat. No. 5,400,376 and owned in common by the assignee of the present invention, the entire disclosure of which is fully incorporated herein by reference. Of course, this is but one example. Those skilled in the art will readily appreciate that many different control circuits can be used to activate the transducers and process the return echo signatures. The surface level is determined by the round trip time between the emission of the acoustic energy and detection of the echoes, and compensated for the attitude of the tank from the reference (in the example of FIG. 1, the reference direction is vertical). Since the array provides a plurality of different directional acoustic beams, the maximum amplitude echoes are selected as the true surface echo, because the maximum return energy will most likely correspond to the transmitted acoustic energy impinging the surface perpendicularly. Using a high repetition rate will also reduce sensitivity to false echoes and bubbles.

When the best echo has been identified, such as based on the strongest echo amplitude, the sensor that detected that echo will indicate the attitude of the tank (for pitch and roll when a full array is used as described herein), particularly over an average time period. For example, if the array of FIG. 1 operates to produce the strongest echo signals from transducer 14 averaged over a selected time period, then the tank attitude is about 5 degrees. The use of time averaging will compensate for the likelihood that individual echoes may be returned at different angles due to surface disturbances. For attitudes in-between the transducer mounting angles, there will be measurable signals from two adjacent sensors with the closest mounting angle.

When the tank attitude is other than level (for the example of FIG. 1), the roundtrip time measurement for the selected surface echo will need to be adjusted in order to determine the fluid level. This is because for non-vertical returns, the echo has actually travelled along a hypotenuse of a right triangle whose vertical leg is the true fluid height plus the height of the transducer that received the echo (see FIG. 1). Since the attitude angle is known, the true vertical height can easily be determined trigonomically from the measured travel time.

Figure 1A:
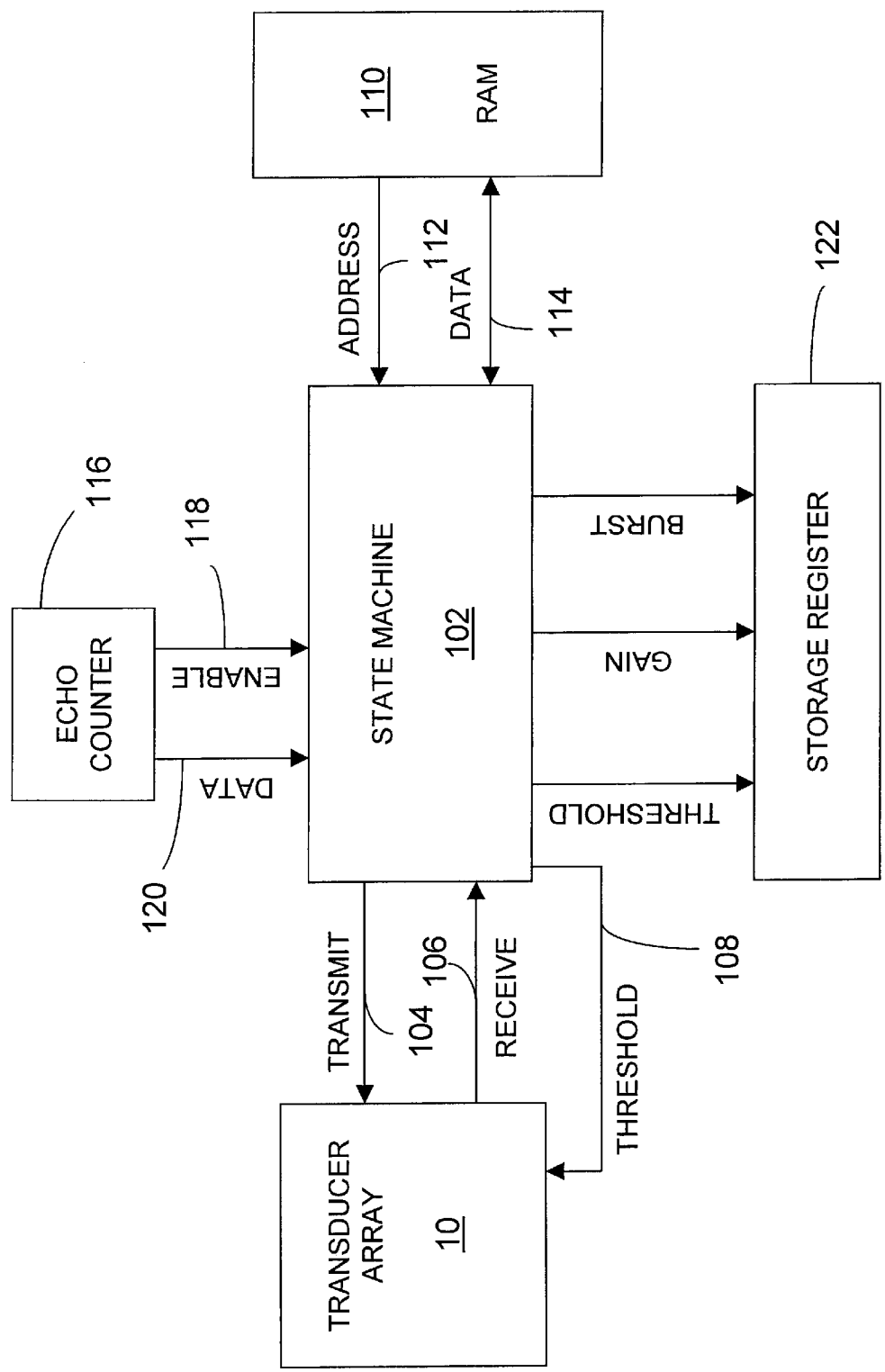
FIG. 1A illustrates an embodiment of a control electronics suitable for use with the present invention.

With reference to FIG. 1A, and as fully described in the referenced U.S. Pat. No. 5,400,376, the control electronics 100 in this embodiment of the invention is realized in the form of a state machine based circuit. The circuit 100 includes a state machine 102 that is connected to the plurality of ultrasonic fuel sensors, such as the transducer array 10 of FIG. 1. The state machine 102 accesses each sensor through a multiplexed transmit bus 104 and a multiplexed echo receive bus 106. The state machine also controls gain, burst duration and an echo threshold signal 108 respectively for each sensor in the array 10.

The state machine 102 is further connected to a random access memory (RAM) device 110 that is used by the state machine 102 during data acquisition to store echo data for each of the sensors in the array 10. The state machine 102 can address the RAM via an address bus 112, and uses signal DATA bus 114 to send and receive data from the RAM 110.

The state machine 102 is operatively connected to an echo counter circuit 116. The echo counter circuit 116 is enabled by the state machine 102 via an ENABLE signal on line 118 and sends echo data to the state machine 102 on data bus 120 in the form of a count which represents the time elapsed between an ultrasonic pulse being transmitted from a particular sensor and the resultant echo being received.

The state machine 102 is also connected to one or more storage registers 122, which are used as a memory to store control parameters such as the echo burst duration, gain values for setting acoustic pulse transmit energy, and threshold values used to detect valid echo returns.

Operation of the circuit of FIG. 1A is as follows. The state machine 102 begins sequentially to interrogate each fuel level sensor in the array 10. For each sensor, the state machine 102 issues an ultrasonic transmit pulse via the multiplexed transmit bus 104 to the active sensor and uses the echo counter to measure the time lapse for a valid echo to return. Transmit pulse energy can be set by a value stored in the register 122. When valid echoes are returned via the multiplexed echo receive bus 106 (wherein a valid echo can be, for example, an echo detected within a valid time window and having a minimum energy level set by a threshold value stored in the register 122), the state machine stores the corresponding data in the RAM 110 at a specific memory location for each sensor. The sensors may be interrogated repeatedly as required.

Figure 3:
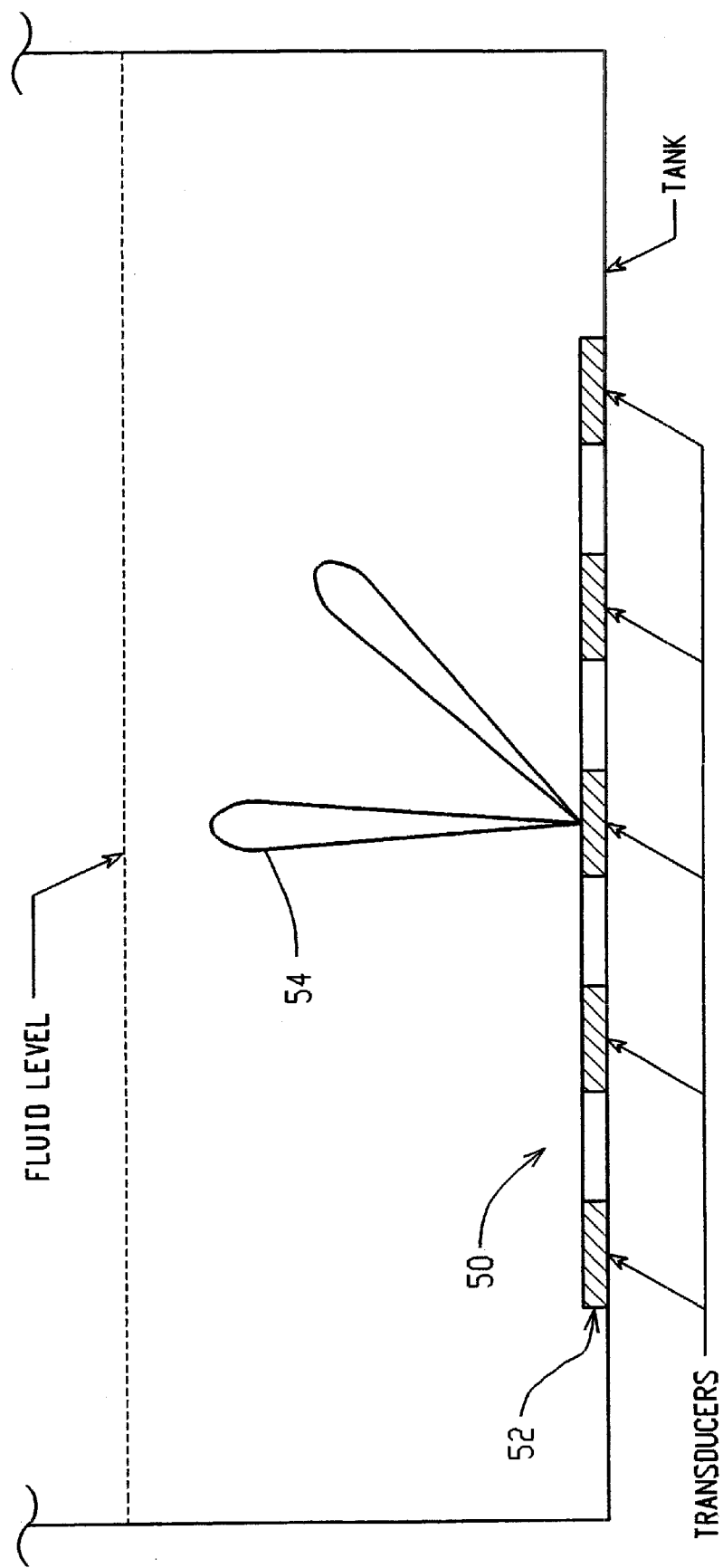
FIG. 3 illustrates another embodiment of the invention.

FIG. 3 illustrates an alternative embodiment of the invention. In this embodiment, a plurality of transducers are disposed in a straight linear array 50 on a flat base 52. The linear array provides for each transducer to be simultaneously electronically energized with a phase delay relative to its adjacent transducer and the spacing therebetween so that an electronically steered beam 54 of acoustic energy is produced. The steered beam is directed towards the fluid surface, but at a variable angle to the plane of the array. The beam can be swept as a function of the electrical phase variation by any of the techniques well known in the art of electronic beam steering. For example, a series of electrical phase generators for excitation signals to the transducer can be implemented digitally using clocks and delay lines, or in an analog manner using a series of filters to produce the desired electrical phase shifts between the elements.

If all the elements of the array 50 are energized with the same excitation signal, i.e. the same frequency, amplitude and phase, then the array functions like a single large area transmitter. If the amplitudes and phases are appropriately varied, however, such as with an increasing phase delay from element to element along the array, it is possible to effect a narrow beam in space where all signals arrive simultaneously in phase for constructive and destructive interference. The linear array of FIG. 3 can easily be extended to a two dimensional array to allow for variations, for example, in pitch and roll.

As few as five elements can be used to produce beam directivities accurate to five degrees or better. Preferably, the elements should be isotropic point radiators. If the elements are on the order of a wavelength the array 50 can operate effectively over plus and minus 45 degrees. To prevent the occurrence of grating lobes, the inter-element spacing should be one-half wavelength or less. For example, with an excitation frequency of 500 KHz for 0.1 inch elements spaced apart by 0.025 inch, a steering angle of 40 degrees can be achieved. Sidelobe content of the directional beam can be reduced by using additional acoustic elements in the array.

The electronically steered beam array approach has several advantages over the angled array embodiment. The array is mechanically simpler to design and install. It also can produce beam directions at practically any angle, as distinguished from the discrete angle approach of the angled array. The steered array is also a relatively flat array so that it is less sensitive to absolute fluid levels. The angled array, by comparison, has an inherent out of plane dimension that limits the fuel height sensitivity. The steered array, however, may require, for some applications, more phase control circuitry. The control circuit described with respect to FIG. 1, such as the control circuit of the referenced patent application herein, is suitable for implementing the steered beam array embodiment, as well as microprocessor-based control systems.

The stillwell-less embodiments of the present invention tend to exhibit reduced echo strength due to attenuation when liquid surface height and/or attitude angles increase. In accordance with the present invention, signal modulation techniques are provided to improve weak echo detection.

A preferred technique is pulse compression. In this technique, a specially encoded transmit waveform and an appropriate signal transformation on the receive signal are used to convert a long period burst into a short duration pulse. In order to allow long duration transmit bursts at relatively low power, the transmit waveform is selected to be a linear FM modulation used with a cross correlation for the transformation.

The cross correlation operation is performed so as to produce a single sharp peak compared to the transmit function [x(t)]. By definition, the cross correlation function is defined as the time integral of x(t) times y(t+tau), where tau is a delay in the y(t) function. A particular advantage of the cross correlation function is that the integration averages out uncorrelated noise such as from bubbles and random wave motion.

A useful excitation signal that produces a sharply compressed correlation function is the chirped sine wave, for example. The chirped sine wave signal is a constant amplitude carrier with a linearly increasing frequency. Since the integral of the product of two sine waves is zero if the signals have different frequencies, the chirped sine wave excitation signal and delayed echo will have the same instantaneous frequency only at time t=echo delay period. Therefore, the cross correlation function produces a sharply defined compressed peak at the delay time, thereby producing a high signal to noise ratio for detecting the return echo.

As an alternative to pulse compression, an FM modulation technique can be used, provided signal bandwidth is not a limitation. In this technique, the carrier is transmitted with a linearly increasing instantaneous frequency. When the echo is received, the frequency of the echo is compared to the frequency of the transmitted signal, and this difference is proportional to the time delay travel of the echo. A requirement of this technique, however, is that the duration of the transmission must be long enough to allow the system to be actively transmitting when the longest delayed echo is received.

The invention thus provides apparatus and methods for detecting fluid levels with acoustic echo ranging without the use of a stillwell and fully compensated for attitude variations of the fluid container. Such methods and apparatus can be enhanced by the use of FM modulation or pulse compression signal processing techniques.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

What is claimed is:

1. Apparatus for determining liquid level in a container, wherein the container can be subjected to attitude variations, comprising: a plurality of transducers for emitting acoustic energy into the liquid in a plurality of different predetermined directions relative to a reference towards the liquid surface from a position below the liquid surface and for receiving echoes; and control electronics means for determining liquid level height based on echo amplitude and time delay between said emissions and detection of said echoes.

2. The apparatus according to claim 1 wherein each said transducer is disposed at an angular offset with respect the other transducers such that each transducer emits acoustic energy towards the liquid surface at a respective angle relative to a reference.

3. The apparatus of claim 2 wherein said transducers are disposed along an arc that extends from a bottom wall of the container.

4. The apparatus of claim 2 wherein each transducer detects a maximum echo energy reflected from the liquid surface when the surface is normal to the respective direction of acoustic energy transmitted from the transducer.

5. The apparatus of claim 2 wherein each transducer detects a maximum echo energy reflected by the liquid surface based on the attitude of the container with respect to said reference.

6. The apparatus of claim 5 wherein said control electronics means detects attitude of the container based on which of said transducers detects a maximum echo amplitude.

7. The apparatus of claim 1 wherein said plurality of transducers are arranged in a transducer array; said apparatus further comprising means for energizing said transducers so as to produce a steered beam of acoustic energy directed towards the liquid surface at different angles with respect to a reference.

8. The apparatus of claim 7 wherein maximum echo energy corresponds to said steered beam impinging the liquid surface substantially normal thereto.

9. The apparatus of claim 1 wherein said control electronics means activates each said transducer to transmit acoustic energy in short duration pulses at a repetition rate that is high relative to liquid surface disturbances.

10. A method for determining liquid level in a container without the use of a stillwell, wherein the container can be subjected to attitude variations, comprising the steps of:

emitting acoustic energy into the liquid in a plurality of different predetermined directions relative to a reference towards the liquid surface using a plurality of transducers;

receiving acoustic echoes using said transducers; and determining liquid level height based on echo amplitude and time delay between said emissions and detection of said echoes.

11. The method of claim 10 wherein said transducers are disposed at different angles relative to a reference such that each transducer emits acoustic energy towards the liquid surface at a discrete predetermined angle.

12. The method of claim 10 wherein said transducers are energized so as to produce a steered acoustic transmission beam to compensate for attitude of the container.

13. Liquid gauging apparatus for an aircraft fuel tank, comprising: transducer means for emitting acoustic energy into a liquid in the tank in a plurality of predetermined directions towards the liquid surface from a position below the liquid surface and for receiving echoes; and signal conditioning means for determining liquid level height based on echo amplitude and time delay between said emissions and detection of said echoes.

14. The apparatus of claim 13 wherein said transducer means produces a steered acoustic energy beam directed towards the liquid surface.

15. The apparatus of claim 13 wherein said transducer means produces a number of discrete acoustic energy beams each directed towards the liquid surface at a respective angle relative to a reference.

16. The apparatus of claim 15 wherein said transducer means comprises an angled transducer array such that each transducer directs ultrasonic acoustic energy towards the liquid surface at a predetermined angle relative to the reference.

* * * * *